US012591444B2

(12) United States Patent
Hsiao et al.

(10) Patent No.: US 12,591,444 B2
(45) Date of Patent: *Mar. 31, 2026

(54) HARDWARE VIRTUAL MACHINE FOR CONTROLLING ACCESS TO PHYSICAL MEMORY SPACE

(71) Applicant: MediaTek Inc., Hsinchu City (TW)

(72) Inventors: Chih-Hsiang Hsiao, Hsinchu City (TW); Hung-Wen Chien, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 790 days.

This patent is subject to a terminal disclaimer.

(21) Appl. No.: 17/883,541

(22) Filed: Aug. 8, 2022

(65) Prior Publication Data

US 2022/0382577 A1     Dec. 1, 2022

Related U.S. Application Data

(63) Continuation-in-part of application No. 17/524,046, filed on Nov. 11, 2021, now Pat. No. 12,061,923.

(60) Provisional application No. 63/252,637, filed on Oct. 6, 2021, provisional application No. 63/123,046, filed on Dec. 9, 2020.

(51) Int. Cl.
*G06F 9/455* (2018.01)

(52) U.S. Cl.
CPC ..................... *G06F 9/45558* (2013.01); *G06F 2009/45579* (2013.01); *G06F 2009/45583* (2013.01)

(58) Field of Classification Search
CPC .................................................. G06F 9/45558
USPC .......................................................... 718/1
See application file for complete search history.

(56) References Cited

U.S. PATENT DOCUMENTS

| | | | | |
|---|---|---|---|---|
| 7,281,102 B1* | 10/2007 | Agesen | ............... | G06F 12/1458 711/158 |
| 7,401,178 B1* | 7/2008 | Tene | ................... | G06F 9/45537 711/2 |
| 7,913,226 B2* | 3/2011 | Lowell | ............... | G06F 9/45533 718/1 |
| 10,474,359 B1* | 11/2019 | Volpe | .................... | G06F 3/0644 |
| 10,515,018 B2* | 12/2019 | Huang | ............... | G06F 12/0253 |

(Continued)

FOREIGN PATENT DOCUMENTS

CN          107562515 A      1/2018

*Primary Examiner* — Mehran Kamran

(74) *Attorney, Agent, or Firm* — Tong J. Lee

(57) ABSTRACT

A system controls access to a physical address (PA) space. The system includes multiple system resources addressable within the PA space, and multiple processing circuits executing multiple virtual machines (VMs). A given region of the PA space is dedicated to addressing the VMs. The system also includes multiple memory management units (MMUs) coupled to corresponding processing circuits. A given MMU is operative to translate a virtual address indicated in an access request from a processing circuit into a requested PA that is accessible by the processing circuit according to a configurable setting of the given MMU. The system further includes multiple memory protection units (MPUs). A given MPU, which is coupled to a target system resource allocated with the requested PA, is operative to grant or deny the request based on information indicating whether the requested PA is accessible to a requesting VM executed on the processing circuit.

20 Claims, 7 Drawing Sheets

(56)                References Cited

U.S. PATENT DOCUMENTS

| | | | |
|---|---|---|---|
| 11,392,506 B2* | 7/2022 | Shanbhogue | G06F 12/145 |
| 2005/0091365 A1* | 4/2005 | Lowell | G06F 9/45533 |
| | | | 709/224 |
| 2006/0161719 A1* | 7/2006 | Bennett | G06F 12/1483 |
| | | | 711/6 |
| 2008/0086729 A1* | 4/2008 | Kondoh | G06F 9/5077 |
| | | | 718/1 |
| 2009/0172341 A1* | 7/2009 | Durham | G06F 9/461 |
| | | | 711/E12.059 |
| 2012/0117301 A1* | 5/2012 | Wingard | G06F 12/1027 |
| | | | 711/6 |
| 2012/0272241 A1* | 10/2012 | Nonaka | G06F 9/5077 |
| | | | 718/1 |
| 2014/0108701 A1* | 4/2014 | Liljeberg | G06F 9/45558 |
| | | | 711/6 |
| 2014/0282501 A1* | 9/2014 | Zeng | G06F 9/5016 |
| | | | 718/1 |
| 2014/0380009 A1* | 12/2014 | Lemay | G06F 9/45558 |
| | | | 711/163 |
| 2015/0100717 A1* | 4/2015 | Bennett | G06F 9/45533 |
| | | | 711/6 |
| 2016/0246732 A1* | 8/2016 | Shanbhogue | G06F 9/30076 |
| 2016/0378530 A1* | 12/2016 | Ramasubramanian | |
| | | | G06F 9/45558 |
| | | | 718/1 |
| 2017/0147378 A1* | 5/2017 | Tsirkin | G06F 9/45558 |
| 2017/0249260 A1* | 8/2017 | Sahita | G06F 9/45533 |
| 2017/0357579 A1* | 12/2017 | Tsirkin | G06F 12/1009 |
| 2018/0173645 A1* | 6/2018 | Parker | G06F 12/1458 |
| 2019/0026231 A1* | 1/2019 | Kottilingal | G06F 9/45558 |
| 2019/0171379 A1* | 6/2019 | Van Riel | G06F 3/0643 |
| 2019/0213028 A1* | 7/2019 | Teng | G06F 9/48 |
| 2019/0361818 A1* | 11/2019 | Ichikawa | G06F 12/1458 |
| 2020/0159558 A1* | 5/2020 | Bak | G06F 9/5077 |
| 2020/0225855 A1* | 7/2020 | Yuan | G06F 3/0637 |
| 2020/0285498 A1* | 9/2020 | Keeth | G06F 21/6218 |
| 2021/0109864 A1* | 4/2021 | Yuan | G06F 12/1475 |
| 2021/0149603 A1* | 5/2021 | Kobayashi | G06F 9/45558 |
| 2021/0263761 A1* | 8/2021 | Tsirkin | G06F 9/45558 |
| 2021/0382740 A1* | 12/2021 | Hoogerbrugge | G06F 12/1441 |
| 2022/0179677 A1* | 6/2022 | Hsiao | G06F 9/45558 |
| 2022/0382577 A1* | 12/2022 | Hsiao | G06F 9/45558 |
| 2023/0091722 A1* | 3/2023 | Hsiao | G06F 3/0622 |
| | | | 711/163 |

* cited by examiner

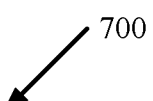

700

Receive a request from a requesting processing circuit for accessing a virtual
address, wherein the requesting processing circuit executes a requesting
VM, and wherein a given region of the PA space is dedicated to addressing
VMs executed in the system
710

Translate, by a given MMU coupled to the requesting processing circuit, the
virtual address into a requested PA that is accessible to the requesting
processing circuit according to a configurable setting of the given MMU
720

Grant or deny, by a given MPU coupled to a target system resource allocated
with the requested PA, the request based on information in a permission
filter indicating whether the requested PA is accessible to the requesting VM
executed on the requesting processing circuit
730

FIG. 7

HARDWARE VIRTUAL MACHINE FOR CONTROLLING ACCESS TO PHYSICAL MEMORY SPACE

CROSS-REFERENCE TO RELATED APPLICATIONS

This application claims the benefit of U.S. Provisional Application No. 63/252,637 filed on Oct. 6, 2021, and is a continuation-in-part of U.S. patent application Ser. No. 17/524,046 filed on Nov. 11, 2021, which claims the benefit of U.S. Provisional Application No. 63/123,046 filed on Dec. 9, 2020, the entirety of all of which is incorporated by reference herein.

TECHNICAL FIELD

Embodiments of the invention relate to a computing system that provides memory protection to a computing system that uses hardware virtual machines to provide memory protection.

BACKGROUND

A hypervisor enables multiple operating systems to run in parallel on a single physical machine. These operating systems, referred to as "guest operating systems," can include multiple instances of an operating system as well as different operating systems. Multiple virtual machines (VMs) can run on top of the hypervisor. Each VM runs a guest operating system to manage resource allocation for the VM. The hypervisor typically uses a memory management unit (MMU) to support address translation and memory protection for the VMs. In a multiprocessor system, each processor core can have its own MMU.

An MMU is responsible for translating virtual addresses to physical addresses. The MMU may include one or more translation look-aside buffers (TLBs) to store a mapping between virtual addresses and their corresponding physical addresses. Some MMUs provide a two-stage memory translation mechanism. Every memory access from applications running on a VM undergoes a two-stage translation in the MMU. A guest operating system configures first-stage translation tables that map a virtual address to an intermediate physical address. The hypervisor configures second-stage translation tables that map the intermediate physical address to a physical address. Thus, the two-stage translation enables a hypervisor to control the guests' view of the memory and to restrict the physical memory that a guest can access.

MMU hardware can be complex and costly. Management of the MMU often requires highly complex software and causes a negative impact on memory usage and performance. Furthermore, complexity is greatly increased and security can be compromised in a shared memory environment where multiple devices can access the same memory location. Thus, there is a need for developing a low-complexity and low-overhead memory protection scheme for a virtual machine system.

SUMMARY

In one embodiment, a system is provided to control access to a physical address (PA) space. The system includes multiple system resources addressable within the PA space, and multiple processing circuits executing multiple virtual machines (VMs). A given region of the PA space is dedicated to addressing the VMs. The system also includes multiple memory management units (MMUs) coupled to corresponding processing circuits. A given MMU is operative to translate a virtual address indicated in an access request from a requesting processing circuit into a requested PA that is accessible by the requesting processing circuit according to a configurable setting of the given MMU. The system further includes multiple memory protection units (MPUs). A given MPU, which is coupled to a target system resource allocated with the requested PA, is operative to grant or deny the request based on information in a permission filter indicating whether the requested PA is accessible to a requesting VM executed on the requesting processing circuit.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 7 is a flow diagram illustrating a method for controlling access to physical address space according to one embodiment.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide an access control mechanism that uses a combination of second-stage memory management units (MMUs) and memory protection units (MPUs) to control access to a physical address (PA) space. The system configures, using hardware such as registers, a predetermined number of virtual machines (VMs) and a given region of the PA space dedicated to addressing the VMs. These VMs are herein referred to as hardware VMs or simply as VMs. Each VM is allocated with specific PA blocks or segments and can be set for specific domain permission. The VMs provide a low-complexity alternative or addition to the access control by conventional MMUs. The VMs also combine the advantages of both master-side access control by MMUs and target-side access control by MPUs.

In one embodiment, an MMU manager manages the configuration of the second-stage MMUs; e.g., which masters have access rights to which physical addresses. Additionally, a hardware VM manager manages the configuration of the MPUs (more specifically, the corresponding permission filters); e.g., which VM has access rights to which physical addresses. In one embodiment, the access control of either the second-stage MMUs or the MPUs can be enabled or disabled.

Figure 1:
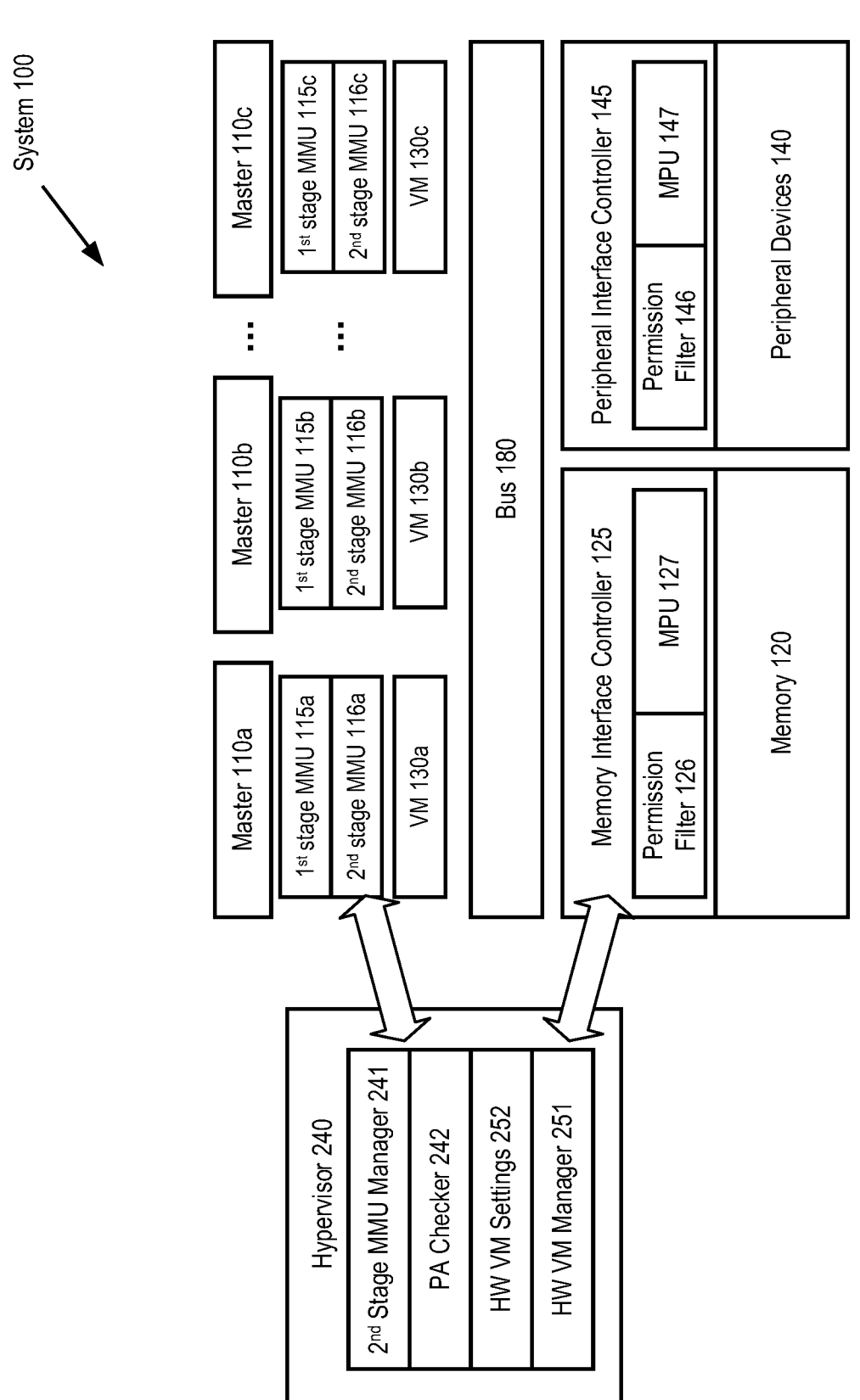
FIG. 1 illustrates a system in which embodiments of the invention may operate.

FIG. 1 is a block diagram illustrating a system 100 according to one embodiment. The system 100 includes multiple masters such as 110a, 110b, 110c, etc., collectively referred to as the masters 110. As used herein, a master is a hardware component that initiates requests to access a target system resource such as a memory, peripheral device, etc. Examples of the masters 110 include, but are not limited to, one or more of the following processing circuits: a central processing unit (CPU), a graphics processing unit (GPU), a digital signal processor (DSP), a multimedia processor, an artificial intelligence (AI) processing unit (APU), a direct memory access (DMA) control, and/or other general-purpose and/or special-purpose processing circuitry.

In one embodiment, the masters 110 may be part of a System-on-a-Chip (SoC) platform. It is understood the embodiment of FIG. 1 is simplified for illustration purposes. Additional hardware components may be included, and some of the components shown in FIG. 1 may be omitted.

In one embodiment, the masters 110 have access to target system resources such as a memory 120. The memory 120 may be the system memory or the main memory of the system 100. The memory 120 may include Random Access Memory (RAM) devices such as a Dynamic Random Access Memory (DRAM) device, a flash memory device, and/or other volatile or non-volatile memory devices. The masters 110 may access the memory 120 via a bus 180 or another form of interconnect. Access to the memory 120 is under the control of a memory interface controller 125. In one embodiment, the masters 110 are operative to execute instructions stored in the memory 120 to run applications and perform system activities.

In one embodiment, the masters 110 also have access to target system resources such as peripheral devices 140, also referred to as I/O devices such as a keyboard, a speaker, a microphone, a display, a camera, etc. The peripheral devices 140 may be accessed via the bus 180 or another form of interconnect under the control of a peripheral interface controller 145. The peripheral devices 140 may include I/O devices and may be memory-mapped. For example, the peripheral interface controller 145 may include or control a device controller that is mapped to a physical address range in which I/O data speed, format, etc., are passed between the masters 110 and the device controller.

In one embodiment, each master 110 uses a memory management unit (MMU) to perform two-stage address translations. Some of the MMUs may be called system SMMUs. Thus, it should be understood that the MMUs illustrated and described herein may include one or more SMMUs.

A first-stage MMU 115 translates from a virtual address (VA) space to an intermediate physical address (IPA) space, and a second-stage MMU 116 translates from the IPA space to a physical address (PA) space in which all of the system resources (e.g., the memory 120 and the peripheral devices 140) are addressable. The mapping between the VA space to the IPA space (i.e., the first-stage MMU 115) is managed by a guest operating system that runs on a VM (e.g., VM 130a, 130b, 130c, etc.), and the mapping between the IPA space to the PA space (i.e., the second-stage MMU 116) is managed by a hypervisor 240 or a host operating system that manages the hardware resources of the system 100. The hypervisor 240 may run on top of a host operating system; alternatively, the hypervisor 240 may be part of the host operating system. In one embodiment, multiple masters 110 may share the same MMU; e.g., multiple DMA controls may share the same SMMU to perform data transfers between the devices in the system 100.

In one embodiment, each second-stage MMU 116 provides master-side access control according to configurable settings that specify which master 110 has access to which page (e.g., a 4K-byte block) in the PA space. The configurable settings are managed by a second-stage manager 241 in the hypervisor 240. In one embodiment, the hypervisor 240 includes a PA checker 242, which verifies the validity of a requested PA in an access request. If the requested PA is verified, the access request is passed on to the target-side access control.

The target-side access control is performed by MPUs, such as an MPU 127 and an MPU 147 in FIG. 1. The memory interface controller 125 includes the MPU 127, which is a hardware circuit including a local memory to store access rights information of each VM with respect to the PA space. The access rights information may be stored in data structures referred to as permission filters 126. The MPU 127 may also store the mapping (i.e., allocation) between VMs and the masters 110. Different masters 110 may be mapped to the same VM (i.e., a shared VM) or different VMs. In one embodiment, the permission filter 126 stores an indication of one or more address ranges for a corresponding VM and master, where the one or more address ranges contain the physical addresses accessible by the VM and the master 110 allocated with the VM. For each address range, the permission filter 126 may indicate the types of access rights; e.g., read, write, execute, etc. The address range may be a fixed-sized address block or a configurable-sized address segment. The MPU 127 grants or denies an access request to a physical address based on the information stored in the corresponding permission filter 126.

In one embodiment, the peripheral interface controller 145 includes the MPU 147, which performs analogous functions to the MPU 127. The MPU 147 uses permission filters 146 to store access rights information for the VMs and the masters 110, where the access rights are with respect to regions in the PA space that are allocated to controllers of the peripheral devices 140. The MPUs 127 and 147 together with the permission filters 126 and 127 provide target-side protection by restricting the physical memory and the memory-mapped resources that a VM can access. This hardware-based memory protection mechanism has low complexity and low overhead. The MPUs 127 and 147 and the permission filters 126 and 127 can be configured by a hardware VM manager 251 in the hypervisor 240. In one embodiment, the mapping between each VM and the corresponding PA regions, blocks, or segments, is stored in hardware VM settings 252.

Figure 2:
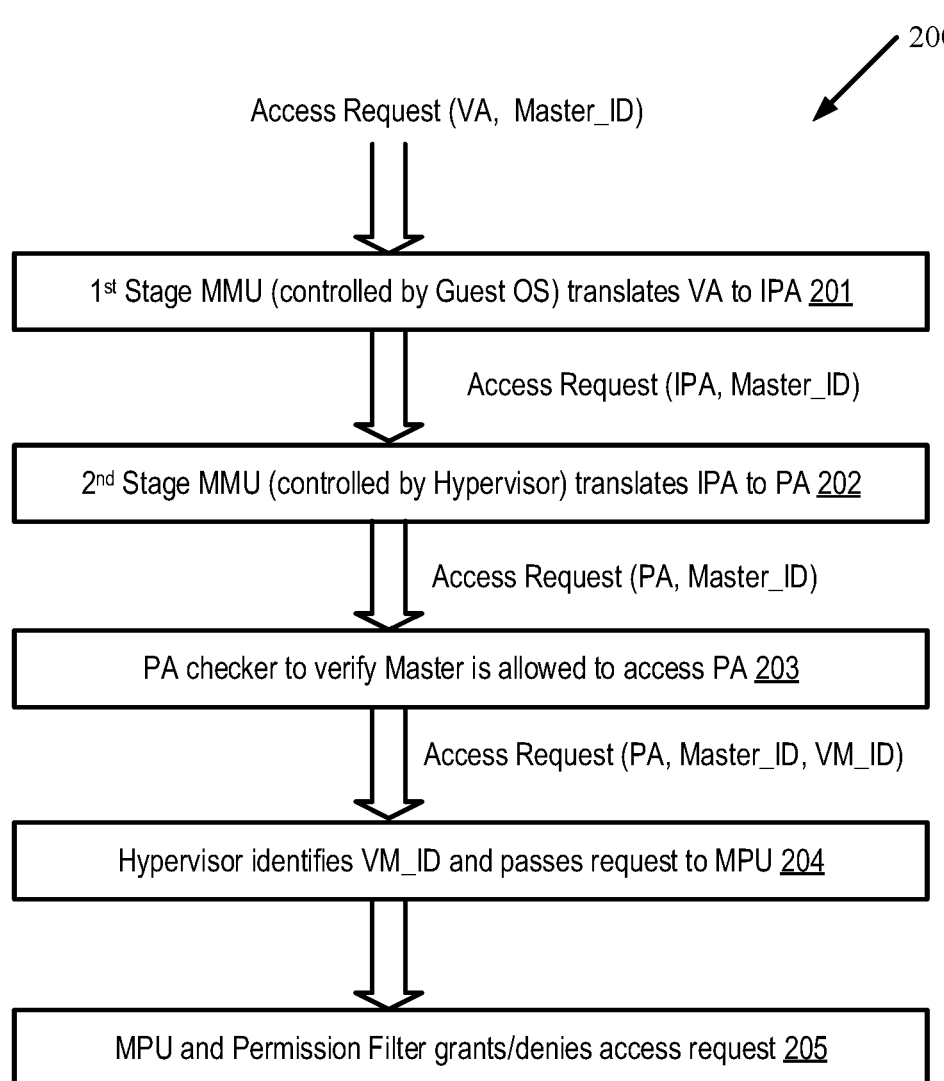
FIG. 2 is a diagram illustrating a process including multiple stages of address mapping in response to an access request according to one embodiment.

FIG. 2 is a diagram illustrating a process 200 including multiple stages of address mapping in response to an access request according to one embodiment. Initially, a master identified by Master_ID sends an access request to its MMU, where the request identifies a requested virtual address (VA). As mentioned before with reference to FIG. 1, the first-stage MMU 115 translates a VA to an intermediate physical address (IPA) (step 201), and the second-stage MMU 116 translates the IPA to a physical address (PA) (step 202). The PA checker 242 verifies that the master is allowed to access the PA (step 203). From hardware VM settings 252 (FIG. 1), the hypervisor 240 identifies the VM_ID for the VM allocated with the PA, and the access request identifying the PA, Master_ID, and the VM_ID is passed on to the MPU 127 (step 204). Based on the stored information in the permission filter 126, the MPU 127 grants or denies the access request (step 205).

Figure 3:
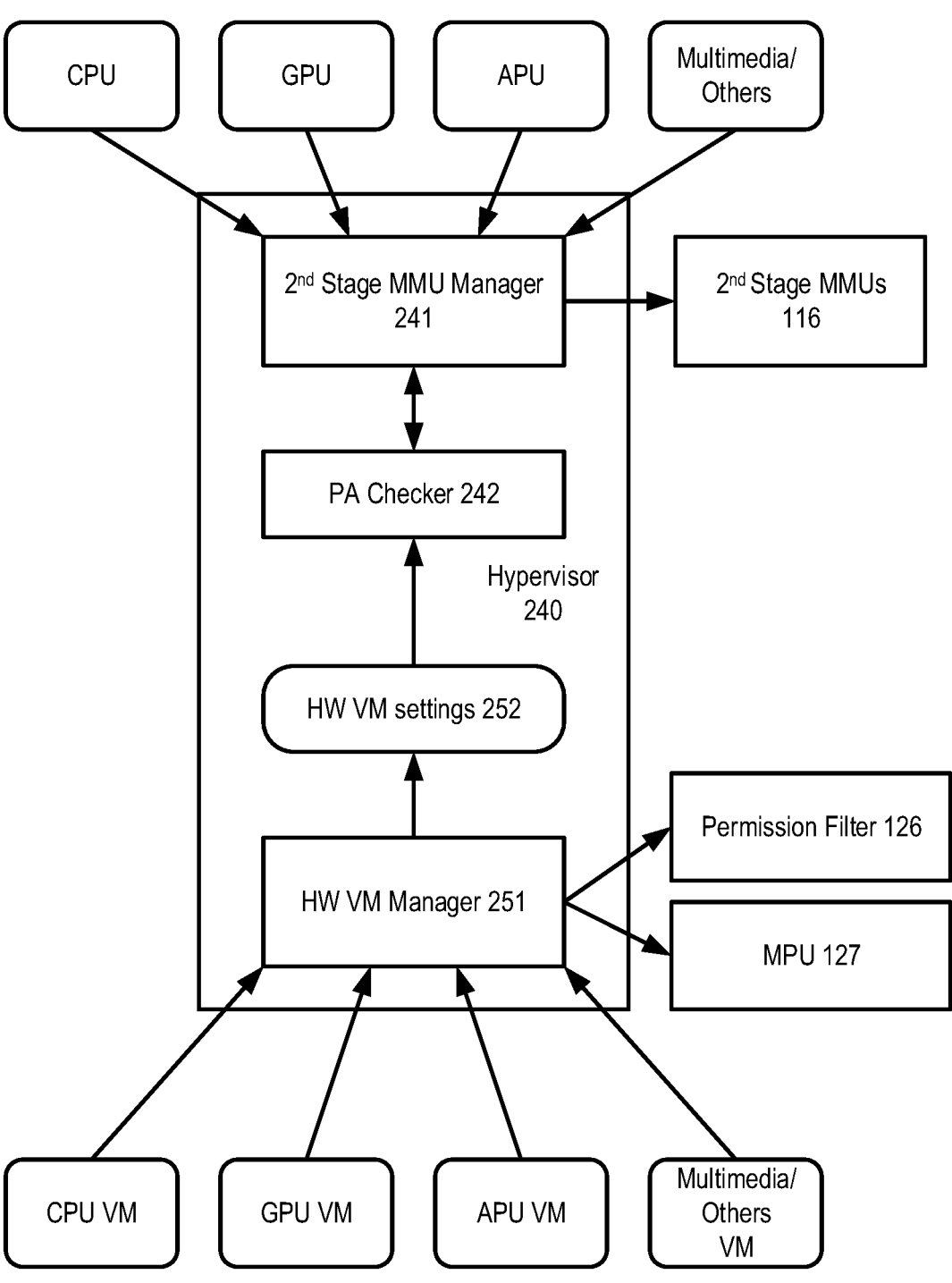
FIG. 3 is a diagram illustrating the management of memory protection according to one embodiment.

FIG. 3 is a diagram illustrating the management of memory protection according to one embodiment. In this example, the second-stage MMU manager 241 manages and configures the address translations performed by the second-stage MMUs 116, as well as the PA checker 242 regarding the PA addresses that each master is allowed to access. The masters in this example include, but are not limited to, a CPU, a GPU, an APU, and a multimedia processor. Each master executes a VM, and different masters execute different VMs. The memory protection provided by the second-stage MMU 116 and the PA checker 242 is further enhanced by the hardware VM manager 251, which manages and configures the hardware VM settings 252, the MPU 127, and the permission filter 126. The hardware VM manager 251 also manages any additional MPUs and permission filters in the system, which are not shown in the examples in FIG. 3 and FIG. 4 to simplify the illustration. The MPUs (and the corresponding permission filters) provide hardware-based memory isolation to prevent each master from accessing the VMs that are allocated to other masters. In one embodiment, both the MMUs and the MPUs are used to provide hardware-based memory isolation to further enhance the security of the system.

The hardware VM settings 252 store the mapping between the VMs and PA blocks/segments. The hardware VM settings 252 may also store the mapping between masters and VMs. Thus, after the PA checker 242 verifies that a requesting master (e.g., the CPU) is allowed to access the PA in the access request, further verification is carried out by the MPU 127 and the permission filter 126 to determine whether the VM executed on the requesting master (e.g., the CPU VM) is allowed to access the PA.

In one embodiment, the PA block size in each VM is greater than the page size used by the second-stage MMU 116. For example, the PA block size may be configured to be 2 megabytes (MB), 1 gigabyte (GB), etc. The page size used by the second-stage MMU 116 may be 4 kilobytes (KB). Managing access control with a small page size (e.g., 4 KB) incurs a significant overhead and degrades system performance. Thus, in some embodiments, the access control performed by the second-stage MMU 116 may be disabled to improve system performance. In these embodiments, memory protection can be provided by the MPUs and the permission filters.

Figure 4:
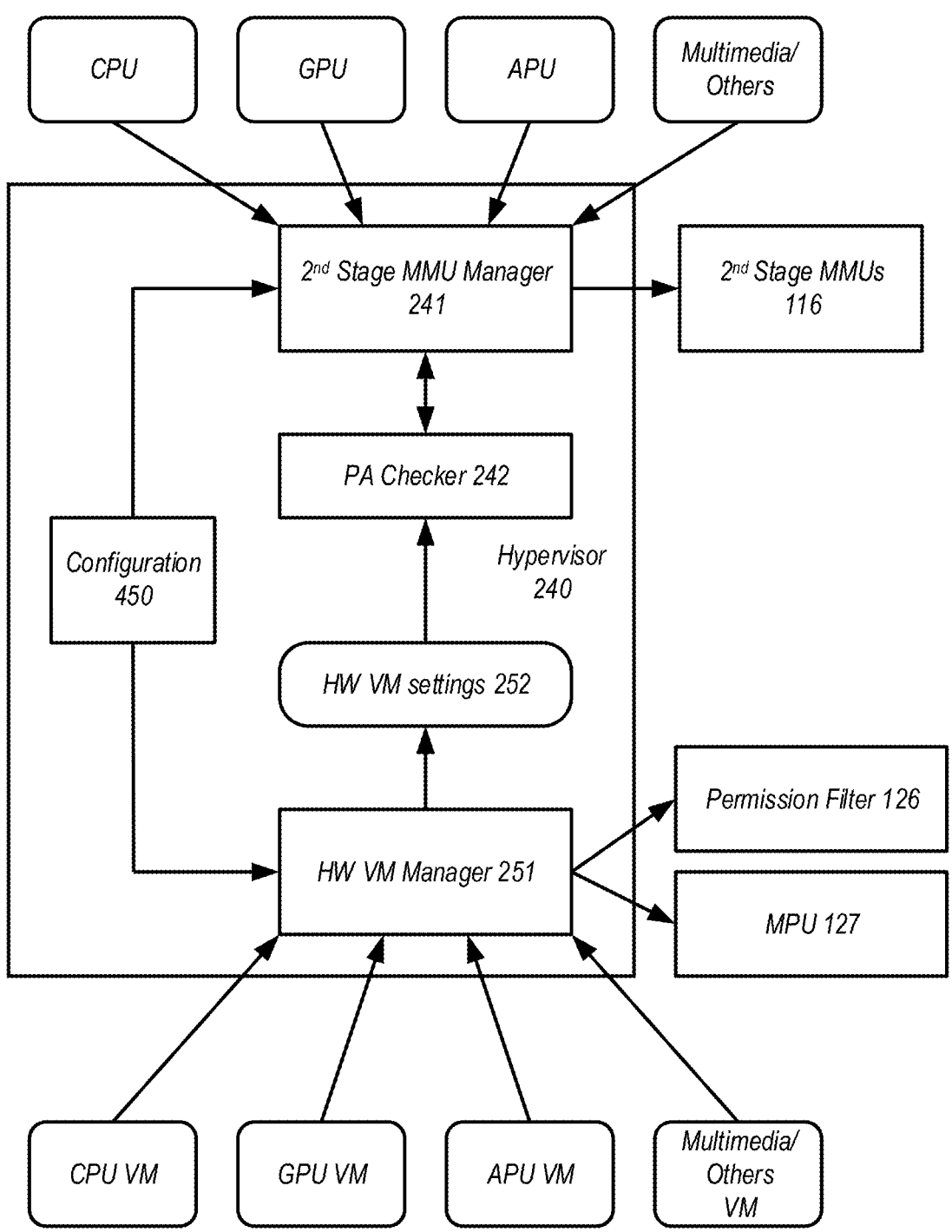
FIG. 4 is a diagram illustrating a configuration for a second-stage MMU manager and a hardware VM manager according to one embodiment.

FIG. 4 is a diagram illustrating a configuration 450 for the second-stage MMU manager 241 and the hardware VM manager 251 according to one embodiment. FIG. 4 adds the configuration 450 to the diagram of FIG. 3. The hypervisor 240 may use the configuration 450 to indicate to the second-stage MMU manager 241 to enable or disable the master-side access control performed by the second-stage MMU 116. Similarly, the hypervisor 240 may use the configuration 450 to indicate to the hardware VM manager 251 to enable or disable the target-side access control performed by the MPU 127 and the permission filter 126. Thus, three alternatives exist with respect to access control. (1) The second-stage MMU 116 is disabled, and the MPU 127 and the permission filter 126 are enabled. (2) The second-stage MMU 116 is enabled, and the MPU 127 and the permission filter 126 are disabled. (3) The second-stage MMU 116, the MPU 127, and the permission filter 126 are all enabled. For example, when the system is running at low performance and the PA block size used by the MPU 127 is greater than the 4 KB size used by the second-stage MMU 116, the hypervisor 240 can disable the access control performed by the second-stage MMU 116 to improve system performance.

In one embodiment, the hypervisor 240 analyzes the requested PA addresses to identify access patterns. For example, when all of the requested PA addresses from a master fall into a limited address range, the hypervisor 240 can enable the corresponding MPU and permission filter to limit the access to that address range. This limited address range may be configured to be used by a single master, shared by multiple masters at the same time or on a time-division multiplexed basis.

Referring again to FIG. 1, the system 100 supports multiple VMs 130. Each VM 130 runs a guest operating system that manages a VA space and the allocation of an IPA space for applications. The hypervisor 240 manages the VMs 130; e.g., by managing the scheduling of the hardware resources for the VMs 130. The hypervisor 240 manages the mapping between the IPA space and an extended PA space for the VMs 130. As will be shown in FIG. 5, the extended PA space is the PA space that addresses the system resources (e.g., the memory 120, the peripheral devices 140, etc.) plus extended PA regions allocated to the VMs 130. The extended PA regions are remapped into a contiguous PA address space dedicated to addressing the VMs 130.

Figure 5:
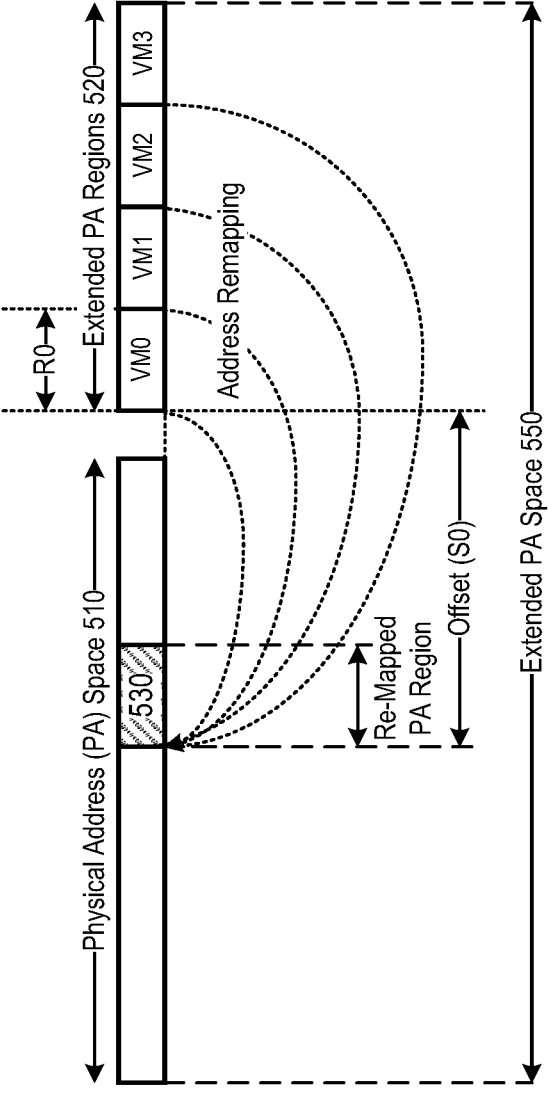
FIG. 5 is a diagram illustrating the address mapping between VMs and physical address space according to one embodiment.

FIG. 5 is a diagram illustrating the address mapping between VMs and PA space according to one embodiment. In the second-stage MMU translation, physical addresses allocated to VMs are mapped into extended PA regions 520. For example, a virtual address allocated to VM0 is mapped to R0, which is an extended PA region 520 allocated to VM0. In an example of four VMs, each VM is allocated with one extended PA region, and different VMs are allocated with different extended PA regions. All of the extended PA regions 320 are non-overlapping and have the same size. The extended PA regions 520 are outside of the PA space 510; the PA space 510 and the extended PA regions 520 are collectively referred to as an extended PA space 550. It is understood that the memory protection mechanism described herein is applicable to any number of VMs.

All of the extended PA regions 520 are remapped to a remapped PA region 530 in the PA space 510. The remapped PA region 530 is dedicated to addressing the VMs. The remapping is performed by hardware. In one embodiment, different extended PA regions 520 have different offsets from the remapped PA region 530. The offsets are also referred to as base address offsets. For example, the extended PA region (R0) allocated to VM0 has an offset (S0) from the remapped PA region; more specifically, the base address of R0 is offset from the base address of the remapped PA region 530 by S0. The extended PA region allocated to VM1 may have an offset (S1) from the remapped PA region 530, where S1=S0+ the size of R0. The offsets for the extended PA regions allocated to VM2 and VM3 can be similarly calculated. Taking R0 as an example, the remapping of R0 to the remapped PA region 530 shifts each address in R0 by S0. The remapping of other extended PA regions can be similarly calculated.

In one embodiment, the extended PA regions 520 allocated to the VMs may not be immediately adjacent to the PA space 510; alternatively, the extended PA regions 320 allocated to the VMs may be immediately adjacent to the PA space 510. In one embodiment, the extended PA regions 520 allocated to different VMs may be consecutive in the extended PA space 550 as shown in FIG. 5; alternatively, the extended PA regions 520 allocated to different VMs may be non-consecutive in the extended PA space 550. In one embodiment, the base address and/or the size of each extended PA region 520 may be configurable.

Allocating the extended PA regions 520 to VMs enables a system to use different page sizes (or block sizes) for a guest operating system and a host operating system. Suppose that VM0-VM3 run on top of multiple instances of a guest operating system in a computing system. The guest operating system may use a first page size for virtual memory management. The host operating system of the computing system can use a second page size (or block size) that is greater than the first page size for virtual memory management. A larger page size can reduce the overhead of host system operations. On the other hand, a smaller page size may be more suitable for VM operations. The MMU of each processor may perform address translations using the first page size for host system operations and the second page size for VM operations.

Figure 6:
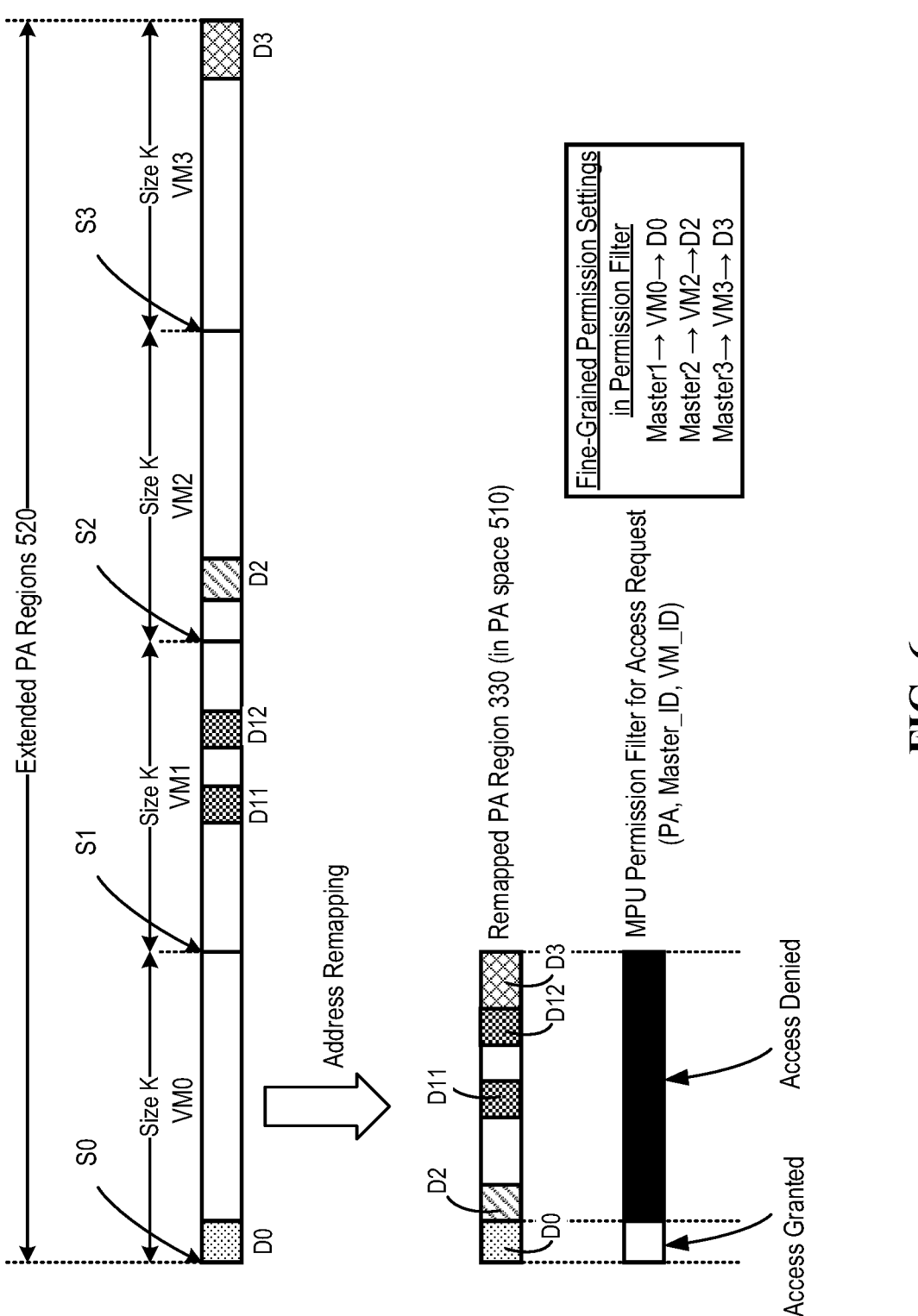
FIG. 6 is a diagram illustrating VM memory protection according to one embodiment.

FIG. 6 is a diagram illustrating VM memory protection according to one embodiment. In this example, four VMs (VM0-VM3) are allocated with extended PA regions (e.g., R0, R1, R2, and R3, respectively). The four extended PA regions have the same size (e.g., K bytes) and are non-overlapping. The base address offsets for the four VMs are indicated as S1, S2, S3, and S4, respectively. All four extended PA regions are mapped into one remapped PA region.

Within each extended PA region, the hypervisor or the host operating system may allocate one or more address blocks and/or address segments to the corresponding VM. The size of the blocks may be fixed (e.g., 2 MB each), and the size of the address segments may be configurable. In the example of FIG. 4, VM0 is allocated with address block D0, VM1 is allocated with address blocks D11 and D12, VM2 is allocated with address block D2, and VM3 is allocated with address segment D3. All of the allocated address blocks and segments are non-overlapping when R0-R3 are mapped to the remapped PA region. In one embodiment, each address segment can be individually switched on (i.e., activated) or off (i.e., deactivated) for allocation.

Referring also to FIG. 1, the memory interface controller 125 may receive a request from a requesting VM (e.g., VM0) for accessing a requested address in the PA space. From the request and the hardware VM settings 252, a domain ID (also referred to as the VM ID) for the requesting VM is identified as VM0. The MPU 127 checks the permission filter 126 of the identified VM ID to determine whether the request should be granted or denied. The permission filter 126 associates VM0 with a list of address blocks and/or address segments that VM0 is allowed or denied access. The permission filter 126 may also associate VM0 with the master on which VM0 runs. The description in connection with FIG. 5 and FIG. 6 applies to access control with respect to the memory 120 and the peripheral devices 140 in FIG. 1.

FIG. 7 is a flow diagram illustrating a method 700 for controlling access to a PA space according to one embodiment. In one embodiment, the method 700 may be performed by a system (e.g., the system 100 in FIG. 1) that includes multiple processing circuits and multiple system resources addressable within the PA space. The processing circuits may include one or more processors and one or more direct memory access (DMA) controllers. The system resources may include system one or more memory devices and one or more peripheral devices.

The method 700 starts at step 710 when the system receives a request from a requesting processing circuit for accessing a virtual address. The requesting processing circuit executes a requesting VM, and a given region of the PA space is dedicated to addressing the VMs executed in the system. At step 720, a given MMU coupled to the requesting processing circuit translates the virtual address into a requested PA that is accessible to the requesting processing circuit according to a configurable setting of the given MMU. At step 730, a given MPU coupled to a target system resource allocated with the requested PA grants or denies the request based on information in a permission filter indicating whether the requested PA is accessible to the requesting VM executed on the requesting processing circuit.

In one embodiment, the system includes multiple MMUs and multiple MPUs. Each MMU includes a first-stage MMU and a second-stage MMU. The second-stage MMU is operative to perform master-side access control for a corresponding processing circuit and is configurable to be disabled. Each MPU is operative to perform target-side access control for a corresponding system resource and is configurable to be disabled. The second-stage MMU is operative to perform master-side access control using a page size and the MPU is operative to perform target-side access control using a block size greater than the page size.

In one embodiment, the information in the permission filter used by the given MPU associates the requesting VM with addresses in the given region of the PA space accessible to the requesting VM. The addresses may be indicated by one or more address blocks having the same block size, one or more address segments having configurable sizes, or a combination of the one or more address blocks and the one or more address segments.

In one embodiment, the information in the permission filter used by the given MPU is configurable to include only the addresses that the requesting processing circuit is authorized to access. In one embodiment, the system is configured to execute multiple VMs, where the total number of the VMs and the given region in the PA space are pre-configured in hardware.

The operations of the flow diagram of FIG. 7 have been described with reference to the exemplary embodiment of FIG. 1. However, it should be understood that the operations of the flow diagram of FIG. 7 can be performed by embodiments of the invention other than the embodiment of FIG. 1, and the embodiment of FIG. 1 can perform operations different than those discussed with reference to the flow diagram. While the flow diagram of FIG. 7 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system operative to control access to a physical address (PA) space, comprising:

a plurality of processing circuits executing a plurality of virtual machines (VMs);

hardware pre-configured to dedicate a given region of the PA space to addressing the VMs, wherein a total number of the VMs is pre-configured in the hardware;

a plurality of system resources addressable within the PA space;

a plurality of memory management units (MMUs) coupled to corresponding processing circuits, wherein a given MMU is operative to translate a virtual address indicated in an access request from a requesting processing circuit into a requested PA that is accessible by the requesting processing circuit according to a configurable setting of the given MMU; and a plurality of memory protection units (MPUs), wherein a given MPU, which is coupled to a target system resource allocated with the requested PA, is operative to grant or deny the request based on information in a permission filter indicating whether the requested PA is accessible to a requesting VM executed on the requesting processing circuit.

2. The system of claim 1, wherein each MMU includes a first-stage MMU and a second-stage MMU, the second-stage MMU is operative to perform master-side access control for a corresponding processing circuit and is configurable to be disabled.

3. The system of claim 1, wherein each MPU is operative to perform target-side access control for a corresponding system resource and is configurable to be disabled.

4. The system of claim 1, wherein the information in the permission filter used by the given MPU associates the requesting VM with addresses in the given region of the PA space accessible to the requesting VM.

5. The system of claim 4, wherein the addresses are indicated by one or more address blocks having a same block size, one or more address segments having configurable sizes, or a combination of the one or more address blocks and the one or more address segments.

6. The system of claim 1, wherein the information in the permission filter used by the given MPU is configurable to include only the addresses that the requesting processing circuit is authorized to access.

7. The system of claim 1, wherein each MMU includes a first-stage MMU and a second-stage MMU, the second-stage MMU is operative to perform master-side access control using a page size and the MPU is operative to perform target-side access control using a block size greater than the page size.

8. The system of claim 1, wherein the plurality of processing circuits include one or more processors and one or more direct memory access (DMA) controllers.

9. The system of claim 1, wherein the plurality of system resources include one or more memory devices and one or more peripheral devices.

10. A method for controlling access to a physical address (PA) space in a system that includes a plurality of processing circuits and a plurality of system resources, comprising:

receiving a request from a requesting processing circuit for accessing a virtual address, wherein the requesting processing circuit executes a requesting virtual machine (VM), and wherein a given region of the PA space is pre-configured in hardware to dedicate to addressing VMs executed in the system, and a total number of the VMs is pre-configured in the hardware;

translating, by a given memory management unit (MMU) coupled to the requesting processing circuit, the virtual address into a requested PA that is accessible to the requesting processing circuit according to a configurable setting of the given MMU; and granting or denying, by a given memory protection unit (MPU) coupled to a target system resource allocated with the requested PA, the request based on information in a permission filter indicating whether the requested PA is accessible to the requesting VM executed on the requesting processing circuit.

11. The method of claim 10, wherein the given MMU includes a first-stage MMU and a second-stage MMU, the method further comprises:

setting a configuration to enable or disable master-side access control performed by the second-stage MMU for the requesting processing circuit.

12. The method of claim 10, further comprising:

setting a configuration to enable or disable target-side access control performed by the given MPU for the target system resource.

13. The method of claim 10, wherein the information in the permission filter used by the given MPU associates the requesting VM with addresses in the given region of the PA space accessible to the requesting VM.

14. The method of claim 13, wherein the addresses are indicated by one or more address blocks having a same block size, one or more address segments having configurable sizes, or a combination of the one or more address blocks and the one or more address segments.

15. The method of claim 10, wherein the information in the permission filter used by the given MPU is configurable to include only the addresses that the requesting processing circuit is authorized to access.

16. The method of claim 10, wherein each MMU includes a first-stage MMU and a second-stage MMU, and the second-stage MMU is operative to perform master-side access control using a page size and the MPU is operative to perform target-side access control using a block size greater than the page size.

17. The method of claim 10, wherein the plurality of processing circuits include one or more processors and one or more direct memory access (DMA) controllers.

18. The method of claim 10, wherein the plurality of system resources include one or more memory devices and one or more peripheral devices.

19. A system operative to control access to a physical address (PA) space, comprising:

a plurality of processing circuits executing a plurality of virtual machines (VMs), a given region of the PA space is dedicated to addressing the VMs;

a plurality of system resources addressable within the PA space;

a plurality of memory management units (MMUs) coupled to corresponding processing circuits, wherein a given MMU is operative to translate a virtual address indicated in an access request from a requesting processing circuit into a requested PA that is accessible by the requesting processing circuit according to a configurable setting of the given MMU; and a plurality of memory protection units (MPUs), wherein a given MPU, which is coupled to a target system resource allocated with the requested PA, is operative to grant or deny the request based on information in a permission filter indicating whether the requested PA is accessible to a requesting VM executed on the requesting processing circuit, wherein each MMU includes a first-stage MMU and a second-stage MMU, the second-stage MMU is operative to perform master-side access control using a page size and the MPU is operative to perform target-side access control using a block size greater than the page size.

20. The system of claim 19, wherein the information in the permission filter used by the given MPU associates the requesting VM with addresses in the given region of the PA space accessible to the requesting VM.

* * * * *